United States Patent

Shaw

[11] 4,052,836
[45] Oct. 11, 1977

[54] PACKAGE FILLING MACHINE AND METHOD

[75] Inventor: Richard A. Shaw, Watsonville, Calif.

[73] Assignee: Richard A. Shaw, Inc., Watsonville, Calif.

[21] Appl. No.: 723,406

[22] Filed: Sept. 15, 1976

[51] Int. Cl.² .................. B65B 63/08; B65B 3/10
[52] U.S. Cl. .............................. 53/25; 53/37; 53/122; 426/414
[58] Field of Search .......... 53/25, 35, 37, 122; 426/414

[56] References Cited

U.S. PATENT DOCUMENTS

| 3,188,780 | 6/1965 | Mead | 53/25 |
| 3,354,613 | 11/1967 | Anderson et al. | 53/251 |
| 3,375,636 | 4/1968 | Redmond | 53/122 |

*Primary Examiner*—Travis S. McGehee
*Attorney, Agent, or Firm*—Townsend and Townsend

[57] ABSTRACT

Apparatus and a method for filling packages with cooked or blanched foods in the form of sticky masses containing water wherein the foods are first placed in a hopper and caused to gravitate into pockets on the outer periphery of a drum rotatable about a generally horizontal axis above a conveyor carrying a number of open packages. As the drum rotates, a mass of the food product is received in each pocket as the pocket moves beneath the hopper. The food product mass in each pocket is retained therein until the pocket approaches the conveyor below the drum. At this point, the food product mass gravitates from the pocket into a package aligned with the pocket and carried by the conveyor. The gravitational movement is assisted by a shiftable piston at the radially inner end of the pocket. The leading part of the food product mass enters the package first, followed by the trailing part, so that the product is uniformly placed in the package and, when so placed, is more pleasing in appearance to the consumer when the package is later opened after being closed and moved through a freezing station. The drum continues to rotate, the pockets continue to receive the food product, and packages are continually filled in the foregoing manner.

11 Claims, 6 Drawing Figures

PACKAGE FILLING MACHINE AND METHOD

This invention relates to improvements in the machine filling of packages moving along a conveyor line and, more particularly, to apparatus and a method for the packaging of wet, sticky foods in packages suitable for frozen food applications.

BACKGROUND OF THE INVENTION

Packaging lines in plants which handle food and other consumer products have, in the past, used packaging machines which fill open packages as they move past a package filling station. These machines are suitable for certain products, either processed or unprocessed, especially those that are in forms which assure that the products do not adhere to adjacent surfaces by surface tension or other forces or at least can be readily scraped from such surfaces. Typical of the products handled by such machines are powders, such as rochelle salts for medicinal use, butter, margarine, lard, candy, soap, plastics, dough, meat balls, ice cream, and the like.

A number of references have disclosed the packaging of food and other products, among which are the following prior U.S. Pats. Nos. 1,091,568; 2,467,268; 2,653,430; 2,823,499; 3,125,039; 3,126,683; 3,768,228; 3,889,448.

For the most part, these patents disclose machines which are complicated in construction and are not disclosed as being suitable for use in packaging of wet, sticky food products which agglomerate when blanched or pre-cooked.

Some attempt has been made to package blanched or pre-cooked vegetables, but these have been generally unsuccessful with certain foods, including leafy, sticky, wet vegetables, such as spinach, mixed greens, chopped broccoli, rubarb and squash. A main reason why problems arise with a vegetable of this type is because the vegetable has a wet, sticky consistency, causing it to ball up or agglomerate when it is being packaged in unit weights or volumes. As the vegetable is dropped into a package, it forms a mound in the center of the mass deposited in the package. This shape makes the corners of the package contain less product than they should, thereby leaving spaces for accumulation of moisture. When the package is moved through a freezing station, this moisture is frozen, leaving a residue which is unsightly and uninviting to the consumer when the package is opened.

Another drawback of the techniques of the prior art for filling packages is the fact that they do not uniformly fill packages time after time with the same basic weight or volume of vegetables of the type described. Some packages may be overweight, some may be underweight, and some may be at the proper weight. However, the probability of having uniformity in weight is relatively low because the product is hard to handle due to its sticky, wet consistency. This causes rejection of many packages and the slowdown of the packaging line, resulting in increased labor and machine operating costs. In lieu of such machine operation, manual filling of the packages has been used but, since labor costs are relatively high, this is an expensive approach to the food packaging problem.

A need, therefore, has arisen for an improved apparatus and method for handling a food product of the wet, sticky, pre-cooked type to render the packaging of such food products faster and cleaner, yet provide uniformity in the filling of packages as the packages move in great numbers along a conveyor line toward a freezing station.

SUMMARY OF THE INVENTION

The present invention satisifes the foregoing need by providing a package-filling machine and method which permits the handling of wet, sticky pre-cooked food products in a manner to allow for fast transfer of unit amounts of such a food product from a large volume of the product into individual packages, yet the food product is so deposited in the package that the food product has a pleasing and acceptable appearance to the consumer when the package, after being frozen, is opened for further cooking or for consumption.

To this end, the machine of this invention includes a drum mounted for rotation about a horizontal axis above a conveyor which moves a plurality of open packages to be filled toward a freezing or other processing station. The drum has a number of spaced pockets on its outer periphery for receiving unit amounts of the food product as the pockets move beneath the open bottom of a hopper containing a large volume of the food product in a wet, runny consistency. Each pocket is substantially of the same shape as each package and has a piston at the radially innermost boundary there. The piston is movable radially outwardly in the corresponding pocket as the latter approaches the lowest part of the path of travel of the drum so that the product leaves the pocket both by gravity and by the action of the piston. The product falls progressively into the package as the drum rotates, the leading part of the product entering the package first, followed by the trailing part, whereby the product is deposited in the package as a flexible, thick strip or mat which has the shape of the package. Thus, the product is situated uniformly in the package rather than in the form of a pile, and the upper surface of the product will be generally flat and parallel with the top of the package, thereby leaving no large spaces for the accumulation of moisture on the upper surface of the product. No unsightly solid residue can thereby form on the upper surface of the package as the contents thereof are passed through the freezing station. As a result, the consumer, when opening the package, views the product without such unsightly residue.

Another advantage of the construction of the machine is that it permits much cleaner and faster package-filling operations on a food packaging line than with capable with prior art machines handling wet, sticky, pre-cooked food products. In the past, such prior art machines have often jammed because of the sticky nature of the products. This problem is eliminated with the present invention because a food product of this type does not jam in the pockets of the drum. It is moved uniformly out of the pockets by gravity and by the action of the corresponding pistons, and substantially no packages are rejected after filling because the machine provides a uniform amount of the product in each package.

Because the product is uniformly placed in the package, the package will not be lumpy or irregular in shape after it is closed and provided with an outer label or cover wrapper. Moreover, the uniformity of placement of the product in the package permits a slightly smaller package to be used for a given weight of food product since a relatively large package is not required to accommodate a pile or mound of the product which results from the use of prior art techniques. These features allow a greater density of packages in a packaging carton so that package and carton costs are minimized, shipping costs are decreased, and labeling costs are reduced.

To illustrate savings in shipping costs with conventionally packaged frozen food products, it is estimated that a loaded railroad car containing cartons of packaged frozen food products occupies 88% of the car, the remaining 12% of the car being packaging tare. A typical food processing plant will package and ship about 100 million pounds of food products per year. This is based on an average of 105,000 to 120,000 pounds per railroad car. It is further estimated that a savings of $40 per railroad car can be realized by using the techniques of the present invention because of the uniformity of food products in the resulting packages. Over a year's time, this will represent a savings of at least $58,000 for the 100 million pounds of product processed in such a plant. Thus, the present invention provides a significant saving and does so by eliminating any manual labor in the packaging of products of the type described.

The primary object of this invention is, therefore, to provide an improved machine and method for packaging wet, sticky, pre-cooked products in open packages moving along a conveyor line wherein the products are deposited as uniform mats or strips into the packages to eliminate mounds or other irregular shapes, yet the process of filling the packages is faster and cleaner than that achieved by the use of conventional packaged-filling machines handling food products of this type.

Another object of the present invention is to provide apparatus and method of the type described wherein a rotary drum having outer peripheral pockets moves beneath a hopper containing a mass of the food product to be packaged and each pocket has a piston associated therewith so that as each pocket is filled with the food product from the hopper and is moved toward the lower end of its path of travel, the food product moves the pocket by both gravity and by the action of the moving piston so that the product will progressively enter each package as a mat or strip and will thereby be uniformly placed in the package to eliminate the formation of spaces in which moisture can accumulate and freeze to thereby assure that the food product, after being frozen in the package, will present an attractive appearance when the package is opened.

Other objects of this invention will become apparent as the following specification progresses, reference being had to the accompanying drawings for an illustration of the machine and method of this invention.

Figure 1:
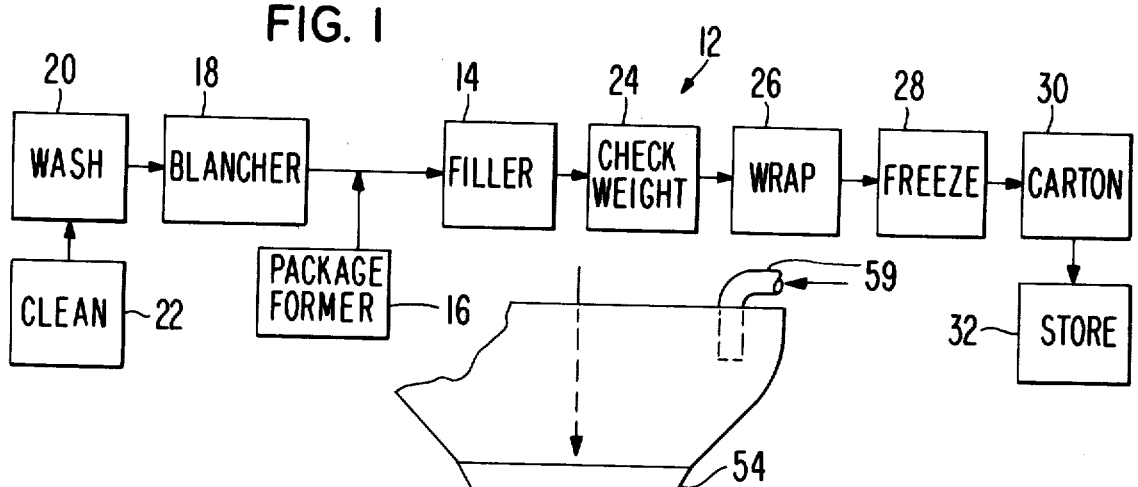
FIG. 1 is a block diagram of a food processing line of which the filling machine and method form a part.
Figure 2:
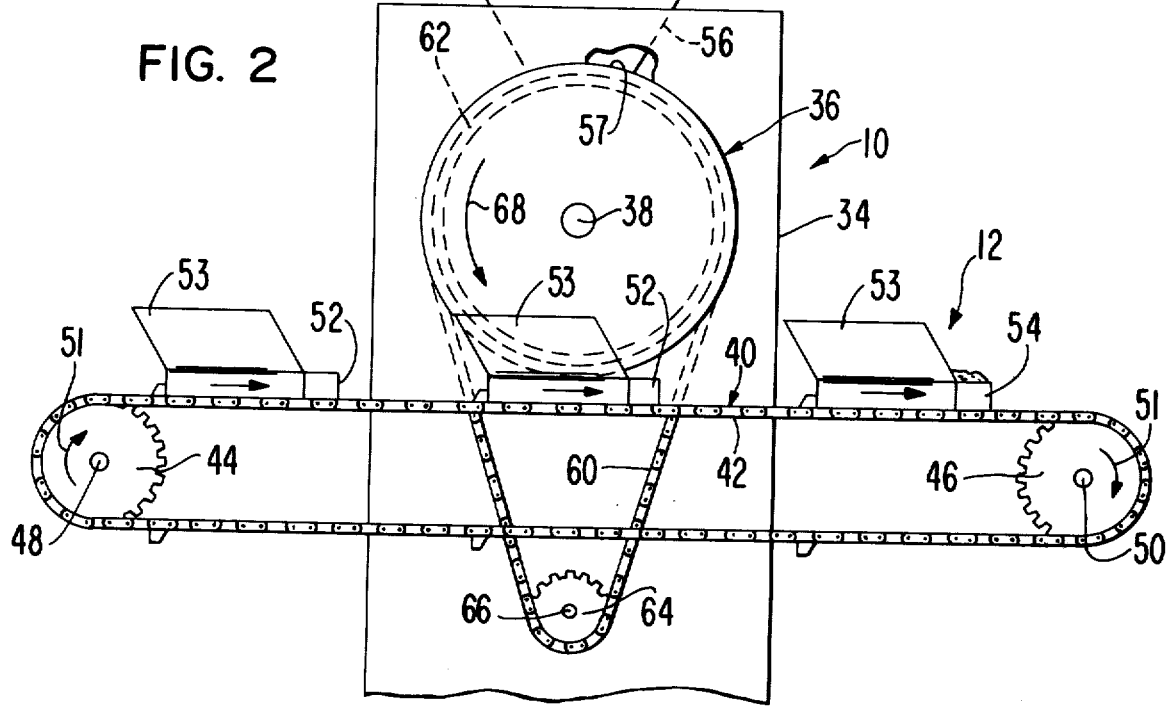
FIG. 2 is a side elevational view of the filling machine, showing a rotary drum and a number of packages moving beneath the drum for receiving unit amounts of a food product therefrom.

The packaging machine of the present invention is broadly denoted by the numeral 10 and is illustrated in FIG. 2. Machine 10 is to be used in a food processing line 12 containing a plurality of stations as shown in FIG. 1. It is especially suitable for use in the handling of pre-cooked, wet, sticky vegetables, such as spinach, chopped brocolli, mixed greens and other such food items. The machine is at a filler station 14 in food processing line 12 (FIG. 1) and is downstream of a package-forming station 16, a blancher station 18, a washing station 20 and a cleaning station 22. A product freshly picked from the field is directed initially to station 22 and then passes along the line to filler station 14. Downstream of filler station 14 is a weight-checking station 24, a packaging-wrapping station 26, a freezing station 28, a carton-filling station 30 and a storage location 32.

Machine 10 includes a generally upright support 34 nounted on a floor or other surface. A drum 36 is mounted on support 34 for rotation about a generally horizontal axis by a shaft 38 above a package conveyor 40 (FIG. 2) formed in any suitable manner, such as by an endless link chain 42 coupled with sprockets 44 and 46 carried on spaced, parallel horizontal shafts 48 and 50, respectively, rotatable in the direction of arrows 51. Conveyor 40 is adapted to advance a number of packages 52 along a generally horizontal path beneath drum 36 with each package having its top 53 open, whereby a unit amount of a food product can be dispensed from the drum into each of the packages as they move beneath the drum. Each package typically is of a lightweight cardboard and assembled from an initially flat sheet of the cardboard.

Support 34 also has a hopper 54 mounted thereon above the drum and the hopper has a chute 56 with an open bottom 57 for directing the food product to be packaged into a number of pockets 58 in the outer periphery of drum 36. A feed tube 59 (FIG. 2) directs the food product in a flow from blancher 18 into hopper 54 at a continuous rate or at a rate sufficient to keep the hopper filled to a predetermined level. Level sensors (not shown) can be used to control the flow of food product into the hopper.

Figure 3:
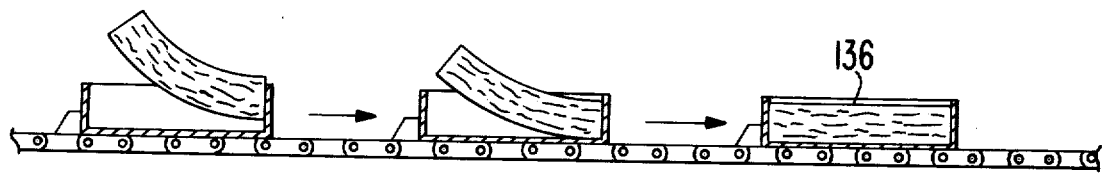
FIG. 3 is a schematic view of the sequence of the filling of a package as it traverses a path beneath the filling machine.

The drum is rotated by an endless, flexible chain 60 mounted on a sprocket 62 coupled with the drum, the chain also being coupled with a second, smaller sprocket 64 rotatably mounted on a shaft 66 carried by support 34. A drive motor (not shown) coupled to shaft 66 causes rotation of the latter, thereby rotation of the drum in the direction of arrow 68 (FIG. 2) at a rate commensurate with the rate of movement of conveyor chain 42 to assure that there will always be a package 52 in alignment with a pocket 58 of drum 36 when the pocket is at the lower end of its path of travel. Thus, a food product leaving the pocket is assured of entering a package therebelow in a manner shown schematically in FIG. 3.

Figure 4:
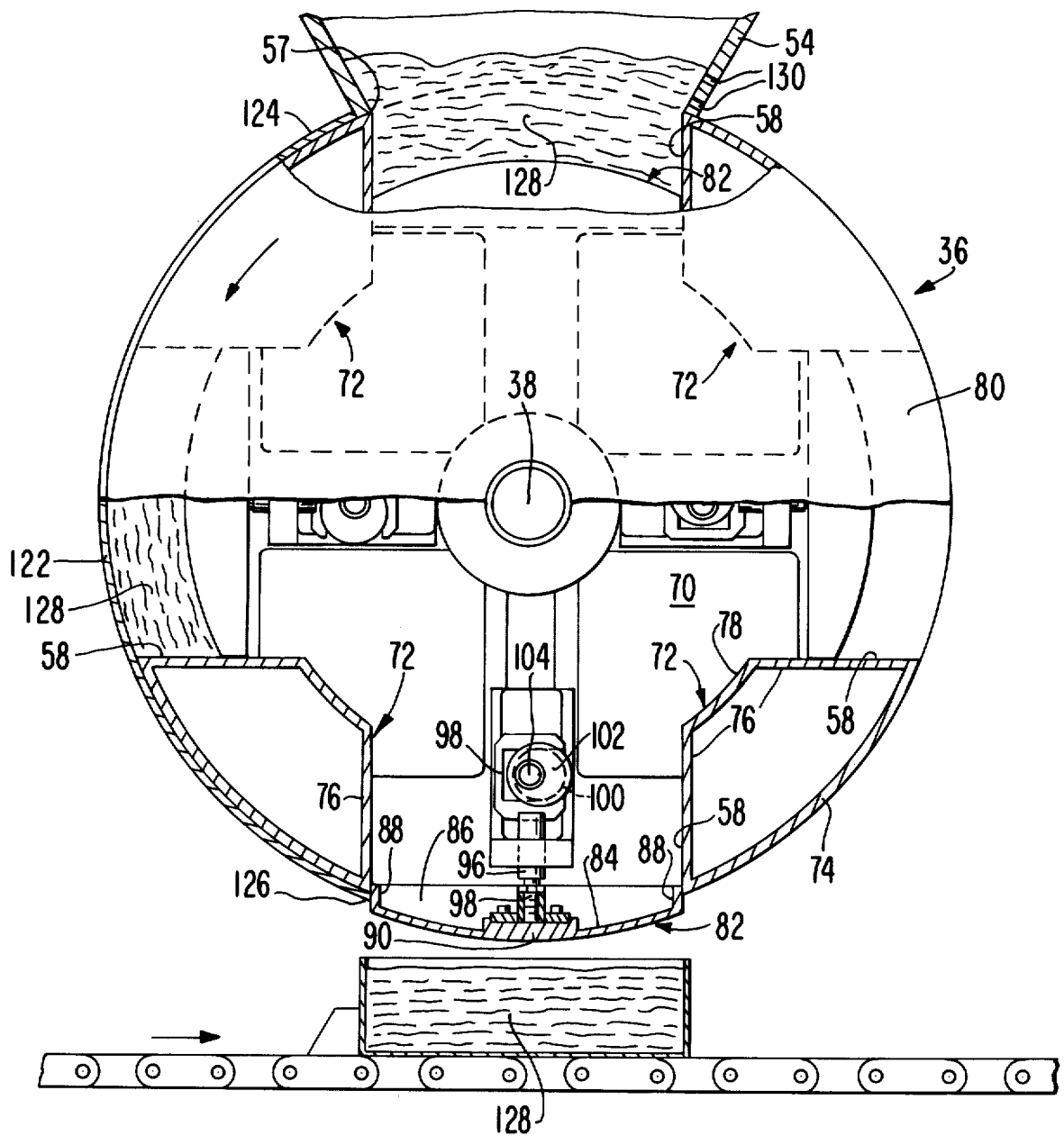
FIG. 4 is an enlarged, side elevational view, partly broken away, of the filling machine with a filled package therebeneath.

Drum 36 is shown in more detail in FIG. 4 and includes a back plate 70 on which a number of web groups 72 are mounted. Since there are four pockets 58 on the outer periphery of the drum, there are four web groups 72 for forming the four pockets. Each web group includes an outer peripheral, curved web 74, a pair of straight end webs 76 extending inwardly from the opposed ends of web 74 and converging toward each other and a second curved web 78 connecting the inner ends of webs 76. Thus, each web 76 of one web group 72 cooperates with the corresponding web 76 of the next adjacent web group 72 to define the opposed ends of a respective pocket 58. Back plate 70 forms one side of the pocket, and a removable front plate 80 (FIG. 4) forms the opposite side of the pocket. The shape of the pocket is rectangular, looking radially inwardly from the outer periphery of the drum, the outer end of each pocket being open. This rectangular shape corresponds to the rectangular shape of each package 52 carried on conveyor 40. Thus, a mass of wet, sticky, pre-cooked food product in each pocket 58 will have a generally rectangular shape and will have a certain thickness so that the food product will be in the form of a mat or strip and leave the pocket as hereinafter described in the mat or strip form for deposit substantially uniformly and complementally in the corresponding package 52 when the pocket is approaching the conveyor and passes the lowest point of travel of the drum.

Figure 6:
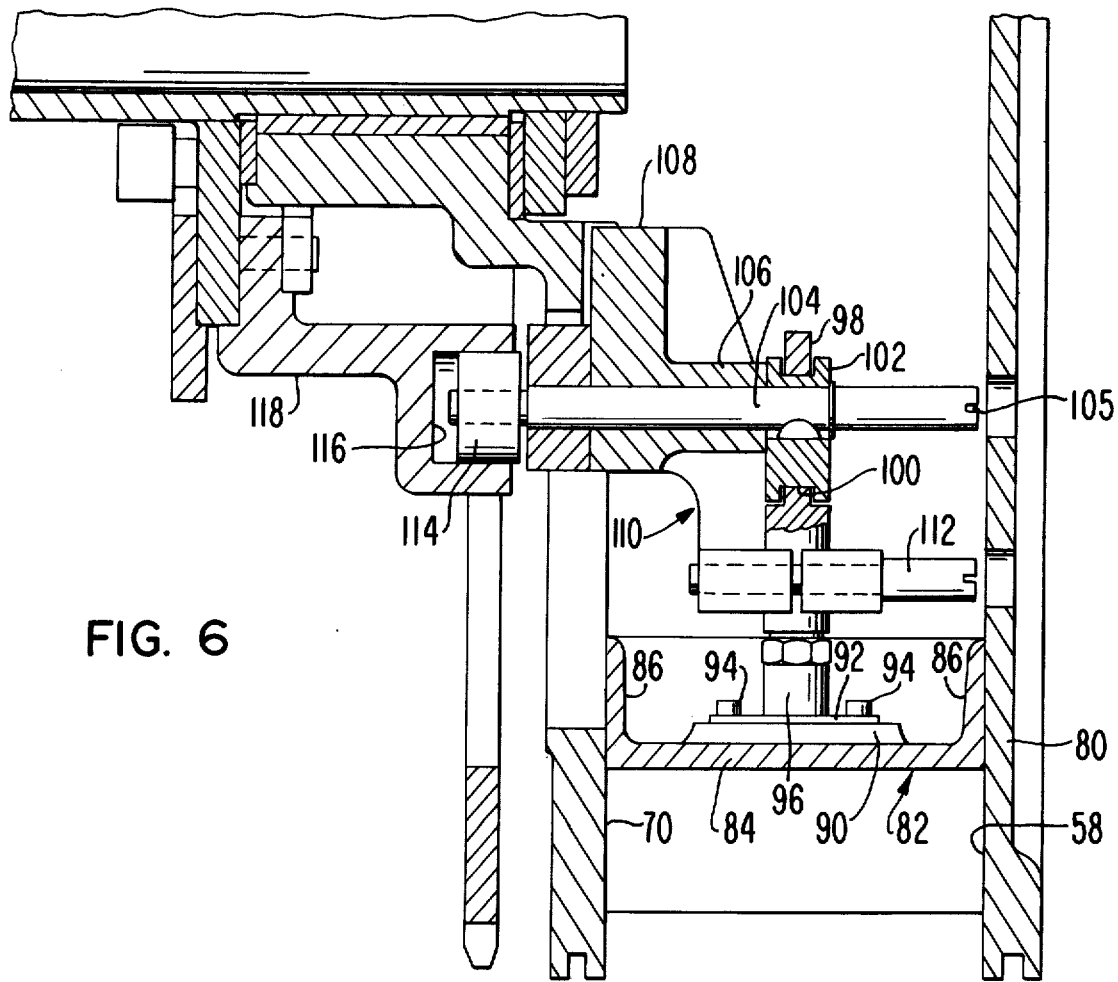
FIG. 6 is an enlarged, cross-sectional view of a portion of the machine, showing the way in which a piston is coupled to the cam and further showing the way in which the stroke of the piston is adusted.

A piston 82 is provided for each pocket 58, respectively. Each piston has a curved, outer member 84 with a generally convex outer face, a pair of webs 86 on opposed sides of member 84 for movement in substantially sliding engagement with backing plate 70 and front plate 80, and a pair of webs 88 on the opposed ends of member 8 (FIG. 4) for substantially sliding engagement with the adjacent webs 76. Boss 90 at the center of member 84 on its inner surface provides a base for mounting a small plate 92 (FIG. 6) thereon by screws 94. A shaft 96 has a threaded end 97 adjustably coupled to an internally threaded sleeve 100 rigidly secured to plate 92. Shaft 96 extends radially inwardly from piston 82. A C-shaped member 98 is rigidly secured to the inner end of the shaft, the sides of member 98 being disposed within an outer peripheral groove 100 (FIGS. 4 and 6) of a disk 102 (FIGS. 4 and 6) having a shaft 104 eccentrically mounted thereon. Shaft 104 extends through a tubular part 106 (FIG. 6) of a casting 108 having a clamp-like portion 110 mounted on shaft 96 and provided with a screw 112 for tightening the clamp on shaft 96. This releasably secures portion 110 on the shaft and thereby establishes the initial position of casting 108 on the shaft. This also establishes or determines the rotative position of disk 102 relative to C-shaped member 98, thus determining the initial position of piston 82 at the radially innermost end of the corresponding pocket 58 and thereby determining the stroke of the piston.

Figure 5:
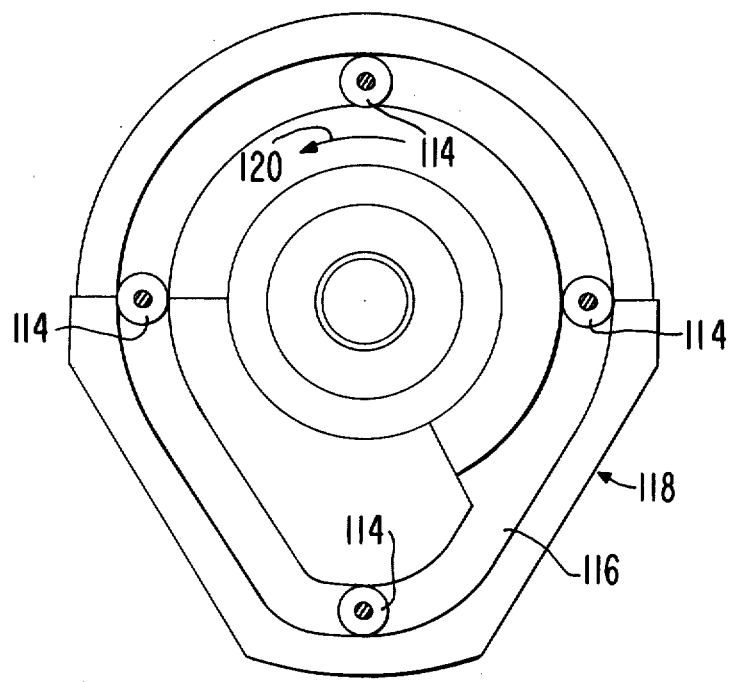
FIG. 5 is a front elevational view of the cam associated with the machine for causing the pistons to shift relative to respective food-receiving pockets on the drum.

A roller 114 is mounted on one end of shaft 104 and is disposed within the cam groove 116 (FIGS. 5 and 6) of a cam plate 118 (FIG. 5) carried in any suitable manner on support 34. The shape of groove 116 is shown in FIG. 5, the upper portion of the groove being semi-circular so that there is no radial movement of a piston as it moves from the 3 o'clock position, to the 12 o'clock position and to the 9 o'clock position in the direction of arrow 120 (FIG. 5). The groove straightens out as it extends from the 9 o'clock position to the 6 o'clock position and from the 6 o'clock position to the 3 o'clock position, this portion of the groove causing a piston to move radially outwardly through a corresponding pocket 58 as the drum rotates. The piston can be made to move so that, at its 6 o'clock position (FIG. 4), it is at or beyond the outer peripheral end of the corresponding pocket.

To change the stroke of each piston 82, the corresponding screw 112 is loosened, allowing casting 108 to move relative to and along shaft 96. This is done by rotating shaft 104 by means of a tool coupled to one end of shaft 104, such as a screwdriver inserted into groove 105 (FIG. 6) of shaft 104. This causes clamp-like portion 110 to move along the length of shaft 96 to a new position. Then, screw 112 is again tightened, securing the clamp-like portion 110 in the new operating position and thereby providing a different stroke for the piston.

A fixed, curved band 122 (FIG. 4) is mounted in any suitable manner on support 34 at one side of drum 36 and extends along and is complemental to the side of the drum for closing the outer ends of pockets 58 as they move along band 122. Band 122 has an upper end 124 near the bottom of hopper 54 and a lower end 126 near but spaced slightly from the lowermost extremity of the drum as shown in FIG. 4. The band serves to retain a food product mass 128 in the corresponding pocket 58 as the mass moves from the upper end of the path of travel of the drum to the lower end thereof. Thus, the food product mass cannot leave the pocket until it is near the lower end of the path of travel of the drum. Since the lower end of band 122 is near the lowermost extremity of the drum, the leading portion of the food product mass 128 in a pocket 58 can start to fall out of the pocket as a mat or strip (FIG. 3a) while the trailing portion of mass 128 is still retained in the pocket. By correlating the rotational speed of the drum with the linear speed of a package on the conveyor, the food product mass128 can be gently and readily moved into the package as a mat or strip, thus assuring uniformity of placement of the mass in the package and avoiding piling or mounding of the food product mass therein as occurs with the use of prior art techniques. In effect, the circular path of travel of pockets 58 and thereby product masses 128 converges toward the linear path of travel of packages 52 as the lowermost extremity of drum 36 is approached.

In operation, a large mass or volume of the food product to be packaged, such as blanched or pre-cooked wet, sticky spinach is placed in hopper 54, such as by flow through tube 59 from blancher 18 into the open top of the hopper. The open bottom of the hopper thereby permits individual masses of the food product to gravitate into the pockets 58 as the drum rotates and as the pockets move into registry beneath the hopper. FIG. 4 illustrates a mass 128 of the food product at the upper pocket 58 (12 o'clock position) in preparation for rotating in a counterclockwise sense to the lower extremity of the path of travel of the drum. In such a position, piston 82 is retracted so that a predetermined volume of the pocket is available for receiving and transferring food product 128.

Since the food product in hopper 54 is wet and sticky, the excess moisture can gravitate from the hopper, such as through drain holes 130 (FIG. 4). Still, the product will be wet as it gravites into each pocket 58.

The drum can rotate continuously or inermittently. The conveyor also moves with the drum, i.e., either continuously or intermittently, to assure that a package 52 will always be in registry with a pocket 58 when the pocket is at the lowermost end of its circular path of travel. The pistons rotate with respective pockets but do not move radially outwardly of the pockets until the pockets pass the 9 o'clock position of the drum on the way to the 6 o'clock position. At about the 8 o'clock position of the drum, the pistons start to move, but move progressively slowly, tending to press some of the water out of the corresponding mat 128 of food product in the corresponding pocket. This water gravitates from the drum through the small clearance between the drum and band 122. Eventually, the pocket becomes opened after passing lower end 126 of band 122 and the mat or strip of food product 128 commences to fall as a mat progressively out of the pocket and into a corresponding package 52 therebelow in the sequential views shown in FIGS. 3a, 3b and 3c. As the mat falls into the corresponding package, it assumes the rectangular shape of the package and will have a generally flat upper surface 136 (FIG. 3) when it is finally settled into the package, thereby avoiding the formation of spaces on which puddles of moisture can collect.

After being filled, each package passes a weight-checking station 24, then through wrapping station 26, freezing station 28, carton station 30 and storage station 32. The above process continues so long as drum 36 rotates and conveyor 40 moves packages 52 below the drum, assuming, of course, that sufficient food product is in hopper 54 to keep the rotating pocket 58 supplied.

The adjustment of the stroke of each piston is made to assure a unit volume and thereby unit weight of food product dispensed each time the drum rotates. The stroke of the piston determines the volume of the corresponding pocket 58 and this can be changed in the manner described above.

I claim:

1. A machine for filling packages with a food product having a wet, sticky consistency comprising: a support; a hopper mounted on the support and adapted to receive the food product, the hopper having an opening in the bottom thereof; a drum mounted on the support beneath the hopper for rotation about a generally horizontal axis, the drum having a number of open, outer peripheral pockets movable successfully into registry with the bottom opening of the hopper to receive individual masses of the food product therefrom; a conveyor disposed beneath the drum and adapted to move a number of open packages along a path permitting the individual masses of the food product to be deposited in respective packages as the drum rotates about said axis; means adjacent to one side of the drum for retaining the food product masses in the pockets as the pockets rotate from a position adjacent to the hopper to a position adjacent to the conveyor, said retaining means permitting each food product mass to leave the pocket as a flexible mat to thereby permit the leading portion of the mat to be deposited in a package before the trailing portion of the mat is received in the package; a piston for each pocket, respectively, each piston being shiftably mounted on the drum and defining the radially innermost boundary of the respective pocket; means coupled with each piston for moving the same outwardly of the respective pocket as a function of the rotation of the drum; means coupled with the drum for rotating the same; and means coupled with the conveyor for moving the same at a speed correlated to the speed of the drum to cause packages placed on the conveyor to move into registry with respective pockets as the latter approach the conveyor.

2. A machine as set forth in claim 1, wherein said retaining means includes a curved band secured to the support.

3. A machine as set forth in claim 2, wherein the upper end of the band is near the lower end of the hopper and the lower end of the band has an edge adjacent to and spaced circumferentially from the lowermost extremity of the drum.

4. A machine as set forth in claim 1, wherein the drum has a back plate, a front plate spaced from the back plate, and web means extending between the plates for defining therewith the pockets on the outer periphery of the drum.

5. A machine as set forth in claim 1, wherein each piston has an outer, generally convex face and is substantially complementally received within the corresponding pocket.

6. A machine as set forth in claim 1, wherein each piston has means adjustably mounting the same on the drum to permit variations in the stroke of the piston.

7. A machine as set forth in claim 1, wherein the drum and said hopper have openings permitting water to drain from the food product carried thereby.

8. A method of packaging a wet, sticky, pre-cooked food product comprising: depositing a volume of the food product in a confined region having a lower opening; successively moving a plurality of spaced pockets along a first path and into registry with the opening; allowing a mass of the food product to gravitate into and substantially fill each pocket, respectively, as the same moves into registry with said opening; moving a number of spaced, open packages along a second path convergent with said first path with the speed of movement and the spacing of the packages being correlated with the speed of movement and the spacing of the pockets; holding each food product mass in the respective pocket as the latter moves away from said opening and toward said second path; progressively removing the holding action on each food product mass as it approaches and moves into registry with a respective package on said second path; depositing each food product mass in the respective package in the form of a mat as the holding action on the food product mass is progressively removed and as the food product mass is in registry with the respective package; and closing and freezing each package with the food product mass therein.

9. A method as set forth in claim 8, wherein the first path is circular and is in a generally vertical plane.

10. A method as set forth in claim 8, wherein the food product masses move along said first path and then into a respective package by gravity, and including the step of urging the food product masses into respective packages as they gravitate from said first path.

11. A method as set forth in claim 8, wherein said depositing step includes allowing the leading portion of each food product mass to enter a respective package before the trailing portion thereof, whereby the food product mass is deposited as a mat in the package.

* * * * *